(12) United States Patent
Li et al.

(10) Patent No.: US 11,112,924 B2
(45) Date of Patent: Sep. 7, 2021

(54) TOUCH SUBSTRATE AND TOUCH DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Ting Li, Beijing (CN); Yuanjie Xu, Beijing (CN); Zhonglin Cao, Beijing (CN); Pengcheng Zang, Beijing (CN); Jing He, Beijing (CN); Wenhua Song, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/822,774

(22) Filed: Mar. 18, 2020

(65) Prior Publication Data

US 2021/0173503 A1    Jun. 10, 2021

(30) Foreign Application Priority Data

Dec. 6, 2019    (CN) .......................... 201922171282.2

(51) Int. Cl.
*G06F 3/047*    (2006.01)

(52) U.S. Cl.
CPC .................................. *G06F 3/047* (2013.01)

(58) Field of Classification Search
CPC ................................................. G02F 1/136204
See application file for complete search history.

(56) References Cited

U.S. PATENT DOCUMENTS

| 6,043,971 A * | 3/2000 | Song ................. G02F 1/136204 |
| | | 349/40 |
| 2014/0111471 A1 * | 4/2014 | Zhao ..................... G06F 3/0446 |
| | | 345/174 |

* cited by examiner

*Primary Examiner* — Robin J Mishler
(74) *Attorney, Agent, or Firm* — Nath, Goldberg & Meyer; Joshua B Goldberg

(57) ABSTRACT

A touch substrate and a touch device are provided. The touch substrate has a touch region and a fan-out region, and includes: touch signal lines located in the touch region; first fan-out lines and second fan-out lines located in the fan-out region, the first fan-out lines and the second fan-out lines are located in a same layer and spaced apart from each other, first ends of the first fan-out lines are coupled with the touch signal lines in a one-to-one correspondence manner, second ends of the first fan-out lines are coupled with a driving chip, the touch substrate further includes a protection element, first ends of the second fan-out lines are coupled with the protection element, second ends of the second fan-out lines are coupled with the driving chip, and the protection element is configured to prevent static electricity from accumulating on the second fan-out lines.

6 Claims, 2 Drawing Sheets

TOUCH SUBSTRATE AND TOUCH DEVICE

CROSS-REFERENCE TO RELATED APPLICATIONS

The present application claims the priority of Chinese Patent Application No. 201922171282.2, filed on Dec. 6, 2019, the contents of which are incorporated herein in their entirety by reference.

TECHNICAL FIELD

The present disclosure relates to the field of touch technology, and particularly relates to a touch substrate and a touch device.

BACKGROUND

In an existing touch product, a fan-out region is often disposed between a touch module and a driving chip, fan-out lines are disposed in the fan-out region, and the touch module is coupled with driving chip through the fan-out lines.

SUMMARY

An aspect of the present disclosure provides a touch substrate having a touch region and a fan-out region, the touch substrate including: a plurality of touch signal lines located in the touch region; a plurality of first fan-out lines and a plurality of second fan-out lines located in the fan-out region, where the first fan-out lines and the second fan-out lines are located in a same layer and are spaced apart from each other, first ends of the first fan-out lines are coupled with the touch signal lines in a one-to-one correspondence manner, and second ends of the first fan-out lines are coupled with a driving chip, the touch substrate further includes a protection element, first ends of the second fan-out lines are coupled with the protection element, second ends of the second fan-out liens are coupled with the driving chip, the protection element is configured to prevent an accumulation of static electricity on the second fan-out lines.

In some implementations, the protection element includes a connection line, a first end of the connection line is coupled to the first ends of the second fan-out lines, and a second end of the connection line is coupled to a voltage terminal.

In some implementations, the voltage terminal includes a common voltage terminal.

In some implementations, the protection element includes a plurality of conductive wires, first ends of the conductive wires are coupled to the first ends of the second fan-out lines in a one-to-one correspondence manner, and second ends of the conductive wires are coupled to each other.

In some implementations, each of the conductive wires has a line width ranging from 1.0 micron to 10 microns.

In some implementations, each of the conductive wires has a resistance greater than 50 kilo-ohms.

In some implementations, each of the conductive wires is disposed in a bending manner.

In some implementations, the conductive wires are made of a material including indium tin oxide.

In some implementations, the touch substrate further includes a plurality of display signal lines located in the touch region and a plurality of third fan-out lines located in the fan-out region, where the touch signal lines and the display signal lines are located in different layers and are insulated from each other, the third fan-out lines are located in a different layer from the first fan-out lines and the second fan-out lines and are insulated from the first fan-out lines and the second fan-out lines, first ends of the third fan-out lines are coupled to the display signal lines in a one-to-one correspondence manner, and second ends of the third fan-out lines are coupled to the driving chip.

Another aspect of the present disclosure provides a touch device including the touch substrate provided as above.

DESCRIPTION OF EMBODIMENTS

In order to make those skilled in the art understand technical solutions of the present disclosure better, following detailed descriptions are given with reference to accompanying drawings and specific implementations.

Figure 1:
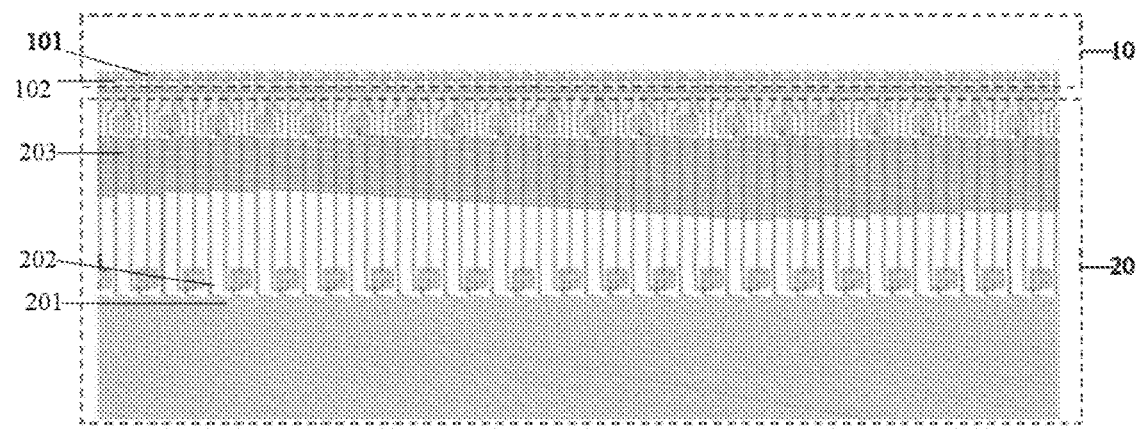
FIGS. 1 and 2 are schematic structural diagrams of a touch substrate according to an embodiment of the present disclosure.
Figure 2:
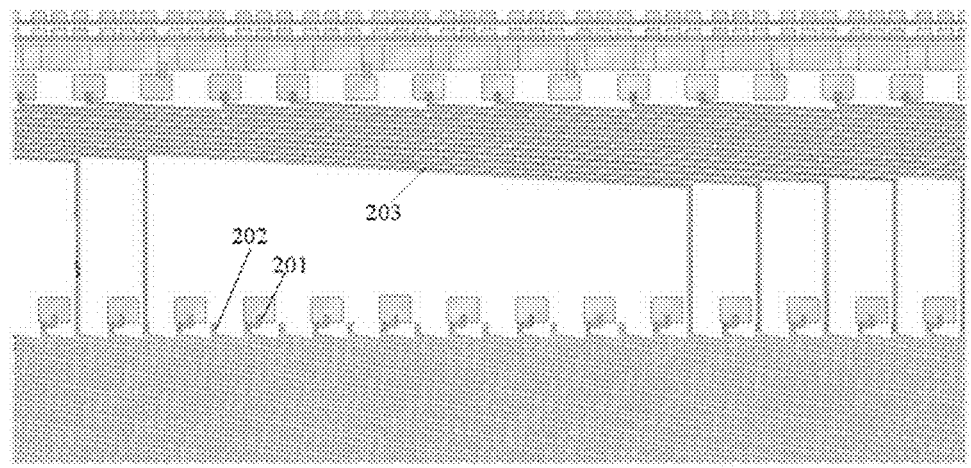

FIGS. 1 and 2 are schematic structural diagrams of a touch substrate according to an embodiment of the present disclosure, and for convenience of illustration, only one film layer is shown in FIG. 2. As shown in FIGS. 1 and 2, the touch substrate has a touch region 10 and a fan-out region 20. A plurality of touch signal lines 101 are disposed in the touch region 10. A plurality of first fan-out lines 201 and a plurality of second fan-out lines 202 are provided in the fan-out region 20. The first fan-out lines 201 and the second fan-out lines 202 may be located in a same film layer and spaced apart from each other. First ends of the first fan-out lines 201 may be coupled with the touch signal lines 101 in a one-to-one correspondence manner through bonding pads, second ends of the first fan-out lines 201 may be coupled with a driving chip through bonding pads, and the driving chip may provide touch signals for the touch signal lines 101 through the first fan-out lines 201, so that a touch function of the touch substrate is realized. First ends of the second fan-out lines 202 are suspended to separate adjacent first fan-out lines 201, so as to avoid interference between touch signals of the adjacent first fan-out lines 201, and second ends of the second fan-out lines 202 may be coupled with the driving chip through bonding pads.

In some implementations, a plurality of display signal lines 102 are further disposed in the touch region 10, and a plurality of third fan-out lines 203 are further disposed in the fan-out region 20. The touch signal lines 101 and the display signal lines 102 may be located in different film layers and insulated from each other. The third fan-out lines 203 may be in a different film layer from the first fan-out lines 201 and the second fan-out lines 202, and are insulated from the first fan-out lines 201 and the second fan-out lines 202. First ends of the third fan-out lines 203 may be coupled with the display signal lines 102 in a one-to-one correspondence manner through bonding pads, second ends of the third fan-out lines 203 may be coupled with the driving chip through bonding pads, and the driving chip may provide display signals for the display signal lines 102 through the third fan-out lines 203, so that the touch substrate further has a display function.

That is to say, in the embodiment, the touch substrate may be implemented as a touch display substrate, the touch region 10 may be implemented as a touch display area, and the driving chip may be a touch and display driver integration (TDDI) chip.

In the touch substrate provided by the embodiment, the first ends of the second fan-out lines 202 are suspended, and the touch signals are present in the first fan-out lines 201 adjacent to the second fan-out lines 202, in practical applications, each of the touch signals in the first fan-out lines 201 is at a voltage varying frequently, thus static electricity is easily induced and generated between the first fan-out lines 201 and the second fan-out lines 202 and accumulated on the second fan-out lines 202, which easily influences the touch function of a touch product or influences the touch function and the display function of a touch display product. If the static electricity is accumulated too much, an electrostatic discharge phenomenon easily occurs, and an internal circuit of the touch product or the touch display product may be damaged, so that a service life of the touch product or the touch display product is influenced.

Figure 3:
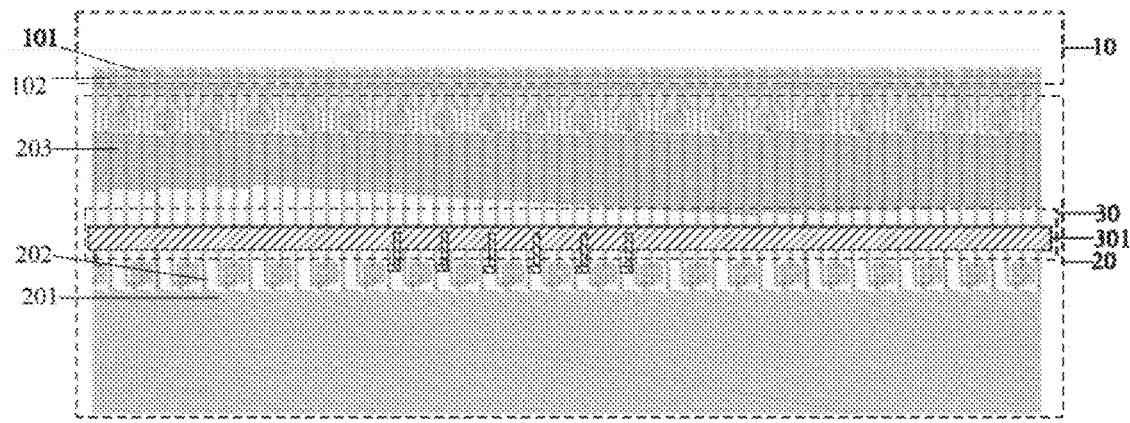
FIGS. 3 and 4 are schematic structural diagrams of a touch substrate according to another embodiment of the present disclosure.

FIG. 3 is a schematic structural diagram of a touch substrate according to another embodiment of the present disclosure. As shown in FIG. 3, the touch substrate has a touch region 10 and a fan-out region 20, and includes: a plurality of touch signal lines 101 disposed in the touch region 10; a plurality of first fan-out lines 201 and a plurality of second fan-out lines 202 disposed in the fan-out region 20. The first fan-out lines 201 and the second fan-out lines 202 may be located in a same film layer and spaced apart from each other. First ends of the first fan-out lines 201 may be coupled with the touch signal lines 101 in a one-to-one correspondence manner through bonding pads, second ends of the first fan-out lines 201 may be coupled with a driving chip through bonding pads, and the driving chip may provide touch signals for the touch signal lines 101 through the first fan-out lines 201, so that a touch function of the touch substrate is realized. The second fan-out lines 202 may separate adjacent first fan-out lines 201; so as to avoid interference between the touch signals of the adjacent first fan-out lines 201. The touch substrate further includes a protection element 30, first ends of the second fan-out lines 202 are coupled to the protection element 30, and second ends of the second fan-out lines 202 may be coupled to the driving chip through bonding pads. The protection element 30 is configured to prevent static electricity from being accumulated on the second fan-out lines 202.

In the touch substrate provided by the embodiment, the second fan-out lines 202 can be prevented from accumulating static electricity due to an influence of the touch signals of the first fan-out lines 201, so that an influence on the touch function of the touch product can be avoided, and meanwhile, a damage to an internal circuit of the touch product caused by electrostatic discharge can be prevented, so that the service life of the touch product can be prolonged, and further, experiences of a user can be improved.

In some implementations, as shown in FIG. 3, the protection element 30 in the touch substrate may include a connection line 301, a first end of the connection line 301 is coupled to the first ends of the second fan-out lines 202, and a second end of the connection line 301 is coupled to a voltage terminal.

It should be noted that the connection line 301 may be a conductive layer made of metal oxide, the connection line 301 may be located in a film layer where the touch signal lines 101 are located, and the connection line 301 is insulated from the touch signal lines 101. The first ends of the second fan-out lines 202 may be coupled to the first end of the connection line 301 through bonding pads, and the second end of the connection line 301 may be coupled to the voltage terminal around the touch region. In such way, the second fan-out lines 202 are all coupled to the voltage terminal through the connection line 301, the voltage terminal can provide an electrical signal for the second fan-out lines 202 through the connection line 301, and the second fan-out lines 202 can be in a voltage jump state the same as the first fan-out lines 201, so that static electricity can be prevented from being accumulated on the second fan-out lines 202 due to an influence of the touch signals of the first fan-out lines 201, the touch function of the touch product can be prevented from being influenced, and a touch effect of the touch product can be improved.

In the embodiment, the voltage terminal may be a common voltage terminal, and the common voltage terminal may provide an electrical signal for the second fan-out lines 202, so that the second fan-out lines 202 are in a voltage jump state the same as the first fan-out lines 201, thereby preventing the second fan-out lines 202 from accumulating static electricity due to the influence of the touch signals of the first fan-out lines 201, and further preventing the touch function of the touch product from being influenced.

Figure 4:
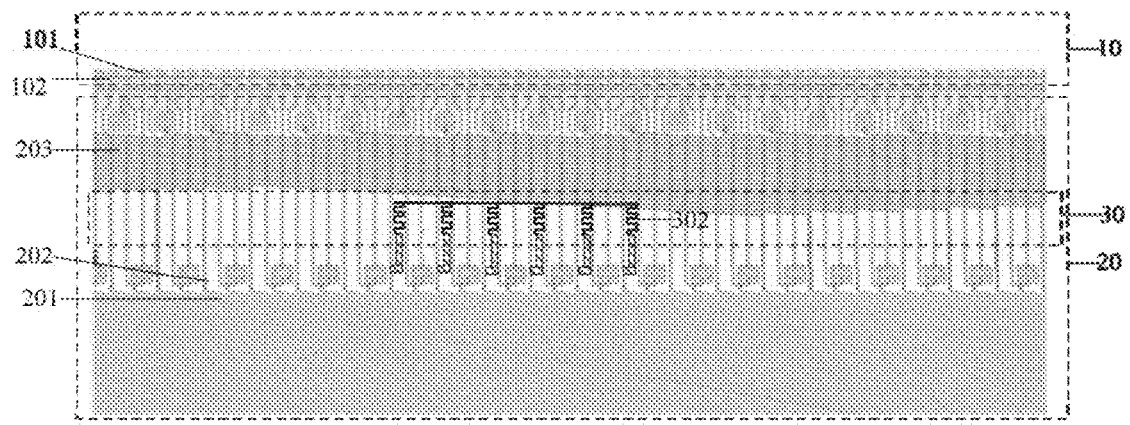

In some implementations, as shown in FIG. 4, the protection element 30 in the touch substrate may include a plurality of conductive wires 302, first ends of the conductive wires 302 are coupled with the first ends of the second fan-out lines 202 in a one-to-one correspondence manner, and second ends of the conductive wires 302 are coupled with each other.

It should be noted that, in the embodiment, since each of the conductive wires 302 has a certain resistance, a current loop can be formed between the conductive wires 302. When the second fan-out lines 202 generate static electricity under the influence of the touch signals of the first fan-out lines 201, a current loop can be formed between the conductive wires 302, the current loop can lead out the static electricity along the conductive wires 302 in time, and the static electricity is consumed by the resistances of the conductive wires 302, so that the static electricity can be timely and effectively discharged, and a circuit damage caused by discharging of the static electricity due to an excessive accumulation of the static electricity can be avoided.

In some implementations, each of the conductive wires 302 has a line width ranging from 1.0 micron to 10 microns.

It should be noted that, in order to realize leading-out and discharging of the static electricity on the second fan-out lines 202, each of the conductive wires 302 may have a relatively large resistance, and each of the conductive wires 302 may be formed by a deposition process, and in practical applications, the line width of each of the conductive wires 302 may be 1.0 micron to 10 microns. It should be understood that other processes may be used to form the conductive wires 302, and the line width of each of the conductive wires 302 may be controlled reasonably to ensure that each of the conductive wires 302 has a sufficiently large resistance.

In some implementations, the resistance of each of the conductive wires 302 is greater than 50 kilo-ohms.

It should be noted that, the resistance of each of the conductive wires 302 being greater than 50 kilo-ohms can ensure that, when a current loop is formed between the conductive wires 302, a current in each of the conductive wires 302 is small, and the circuit is prevented from being damaged by electrostatic discharge. It should be understood that the resistance of each of the conductive wires 302 may be any of other larger values, which are not listed here.

In some implementations, each of the conductive wires 302 may be provided in a bending manner.

It should be noted that each of the conductive wires 302 may be bent as shown in FIG. 4, so as to arrange longer conductive wires 302 in a limited wiring space, thereby increasing the resistance of each of the conductive wires 302, further reducing the current in the current loop formed between the conductive wires 302, and avoiding the damage to the circuit due to the electrostatic discharge.

It should be understood that the conductive wires 302 may be disposed in a surrounding manner, or the like, as long as longer conductive wires 302 can be disposed in a limited space.

In some implementations, as shown in FIGS. 3 and 4, the touch substrate further includes a plurality of display signal lines 102 disposed in the touch region 10 and a plurality of third fan-out lines 203 disposed in the fan-out region 20. The touch signal lines 101 and the display signal lines 102 may be located in different film layers and insulated from each other. The third fan-out lines 203 may be in a different film layer from the first fan-out lines 201 and the second fan-out lines 202, and are insulated from the first fan-out lines 201 and the second fan-out lines 202. First ends of the third fan-out lines 203 may be coupled with the display signal lines 102 in a one-to-one correspondence manner through bonding pads, second ends of the third fan-out lines 203 may be coupled with the driving chip through bonding pads, and the driving chip may provide display signals for the display signal lines 102 through the third fan-out lines 203, so that the touch substrate further has a display function.

That is to say, in the embodiment, the touch substrate may be implemented as a touch display substrate, the touch region 10 may be implemented as a touch display area, and the driving chip may be a touch and display driver integration (TDDI) chip.

In some implementations, the second end of the connection line 301 included in the protection element 30 may be coupled to a common voltage terminal, which is coupled to a common electrode of the touch region, at a periphery of the touch region of the touch substrate.

In some implementations, the conductive wires 302 may be made of a material including indium tin oxide.

It should be noted that the indium tin oxide is a transparent material with conductive performance, which can prevent the conductive wires 302 from affecting transmittance of light. It should be understood that the conductive wires 302 may be made of any of other metal materials or conductive film materials, which are not listed here.

An embodiment of the present disclosure further provides a touch device, which includes the touch substrate provided in the above embodiments. It should be understood that the touch device may be a smart phone, a tablet computer, a smart watch, or any other terminal touch device.

The touch device provided by the embodiment includes the touch substrate provided by the above embodiments, and therefore, the touch device provided by the embodiment has all features and advantages of the touch substrate provided by the above embodiments, and further description thereof is omitted here.

It should be noted that, as required, the touch device provided in the embodiment may further include other elements such as a power supply and a controller, which are not specifically limited in the present disclosure.

It should be understood that the above embodiments and implementations are merely exemplary embodiments and implementations that are employed to illustrate principles of the technical solutions of the present disclosure, but the present disclosure is not limited thereto. It would be apparent to those skilled in the art that various changes and modifications may be made therein without departing from spirit and scope of the present disclosure, and these changes and modifications should be construed as falling within the scope of the present disclosure.

The invention claimed is:

1. A touch substrate, having a touch region and a fan-out region, the touch substrate comprising: a plurality of touch signal lines located in the touch region; a plurality of first fan-out lines and a plurality of second fan-out lines located in the fan-out region, wherein,
   the first fan-out lines and the second fan-out lines are located in a same layer and are spaced apart from each other, first ends of the first fan-out lines are coupled with the touch signal lines in a one-to-one correspondence manner, second ends of the first fan-out lines are coupled with a driving chip,
   the touch substrate further comprises a protection element, first ends of the second fan-out lines are coupled with the protection element, second ends of the second fan-out lines are coupled with the driving chip, and the protection element is configured to prevent static electricity from accumulating on the second fan-out lines,
   wherein the protection element comprises only a plurality of conductive wires, first ends of the conductive wires are coupled with the first ends of the second fan-out lines in a one-to-one correspondence manner, and second ends of the conductive wires are coupled with each other, and
   wherein each of the conductive wires has a resistance greater than 50 kilo-ohms.

2. The touch substrate of claim 1, wherein each of the conductive wires has a line width ranging from 1.0 micron to 10 microns.

3. The touch substrate of claim 1, wherein each of the conductive wires is disposed in a bending manner.

4. The touch substrate of claim 1, wherein the conductive wires are made of a material of indium tin oxide.

5. The touch substrate of claim 1, further comprising a plurality of display signal lines located in the touch region and a plurality of third fan-out lines located in the fan-out region, wherein,
   the touch signal lines and the display signal lines are located in different layers and are insulated from each other, the third fan-out lines are located in a different layer from the first fan-out lines and the second fan-out lines and are insulated from the first fan-out lines and the second fan-out lines, first ends of the third fan-out lines are coupled with the display signal lines in a one-to-one correspondence manner, and second ends of the third fan-out lines are coupled with the driving chip.

6. A touch device, comprising the touch substrate according to claim 1.

* * * * *